(12) United States Patent
Takasu et al.

(10) Patent No.: US 9,627,679 B2
(45) Date of Patent: Apr. 18, 2017

(54) SEALED BATTERY AND METHOD FOR MANUFACTURING THE SAME

(75) Inventors: Junta Takasu, Komaki (JP); Takashi Harayama, Toyota (JP); Kazuyuki Kusama, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 264 days.

(21) Appl. No.: 14/381,300

(22) PCT Filed: Mar. 8, 2012

(86) PCT No.: PCT/JP2012/055999
§ 371 (c)(1),
(2), (4) Date: Aug. 27, 2014

(87) PCT Pub. No.: WO2013/132632
PCT Pub. Date: Sep. 12, 2013

(65) Prior Publication Data
US 2015/0104700 A1     Apr. 16, 2015

(51) Int. Cl.
  *H01M 2/36*   (2006.01)
  *H01M 2/04*   (2006.01)
  *H01M 2/08*   (2006.01)

(52) U.S. Cl.
  CPC ......... *H01M 2/365* (2013.01); *H01M 2/0486* (2013.01); *H01M 2/08* (2013.01); *Y10T 29/4911* (2015.01)

(58) Field of Classification Search
  CPC ............................. H01M 2/365; H01M 2/08
  USPC .......................................................... 429/185
  See application file for complete search history.

(56) References Cited

U.S. PATENT DOCUMENTS 6,455,193 B1 *  9/2002  Miyazaki .............. H01M 2/365
                                                           29/623.2

FOREIGN PATENT DOCUMENTS

| JP | 2000-268811 | 9/2000 |
| JP | 2009-87659  | 4/2009 |

\* cited by examiner

*Primary Examiner* — Jayne Mershon
(74) *Attorney, Agent, or Firm* — Finnegan, Henderson, Farabow, Garrett & Dunner, LLP

(57) ABSTRACT

Provided is a technique for suppressing welding faults caused in sealing a case of a sealed battery by laser welding. A step for manufacturing a sealed battery having a case sealed by a sealing plug and a sealing plate, which includes a sealing step for fitting the sealing plug into a pouring hole formed in a recess of a lid portion and inserting the sealing plate into the recess, and a welding step for joining the sealing plate to the recess by laser welding. In the sealing step, a heat-insulating member is provided in a minute space defined by the recess, the sealing plug and the sealing plate so as to block at least a part of the boundary portion between the sealing plate and the recess. In the welding step, welding is completed at a position where the heat-insulating member is present in the boundary portion.

5 Claims, 5 Drawing Sheets

SEALED BATTERY AND METHOD FOR MANUFACTURING THE SAME

CROSS-REFERENCE TO RELATED APPLICATIONS

This application is a national phase application of International Application No. PCT/JP2012/055999, filed Mar. 8, 2012, the content of which is incorporated herein by reference.

TECHNICAL FIELD

The present invention relates to a sealed battery and particularly to a technique for sealing a pouring hole through which electrolyte solution is poured.

BACKGROUND ART

Conventionally, there is a widely known sealed battery including an electrode body and a case for housing the electrode body together with electrolyte solution, the electrode body formed by layering paired electrodes (positive and negative electrodes), which are formed into sheet shapes, with a separator sandwiched therebetween and by winding the electrodes and the separator.

In the above-mentioned sealed battery, the case is sealed by welding the case and a sealing member arranged to plug a pouring hole formed in the case after pouring the electrolyte solution into the case through the pouring hole.

In the sealed battery, the case needs to be completely sealed. When the sealing member and the case are welded together, the electrolyte solution attached to the pouring hole may cause welding faults.

A technique for solving such a problem is described in Patent Literature 1.

As shown in FIG. 7, a sealed battery described in Patent Literature 1 includes a case having a housing portion for housing an electrode body (not shown) and a lid portion for closing an open face of the housing portion. A recess which is recessed toward the inside of the case is formed in the lid portion and a pouring hole connecting the inside and the outside of the case is formed in the recess.

In the sealed battery described in Patent Literature 1, the case is sealed by fitting a rubber sealing plug into the pouring hole to thereby seal the pouring hole. Furthermore, the case is completely sealed by inserting a plate-shaped sealing plate, which is fixed to a portion (upper portion in FIG. 7) of the sealing plug on an opposite side from the fitted portion, into the recess and by joining the sealing plate to the case by laser welding.

In this manner, by sealing the pouring hole, to which electrolyte solution may be attached, with the sealing plug and then by joining; the sealing plate to the case by the laser welding, the ease is reliably sealed and welding faults are reduced.

However, in the sealed battery described in Patent Literature 1, a minute space is defined by the recess in the lid portion, the sealing plug, and the sealing plate. Therefore, when the sealing plate and the case are joined together by the laser welding to seal the space, gas which is present in the space may rapidly expand due to heat of a laser beam, and melted portions of the sealing plate and the case may flow outside the case to thereby cause the welding faults.

CITATION LIST

Patent Literature

Patent Literature 1: JP 2009-87659 A

SUMMARY OF INVENTION

Problem to be Solved by the Invention

The objective of the present invention is to provide a technique for suppressing welding faults caused in sealing a case of a sealed battery by laser welding.

Means for Solving the Problem

A first aspect of the present invention is a method for manufacturing a sealed battery including a case having a housing portion with an open face, and a lid portion for closing the open face of the housing portion, in which the lid portion has a recess which is recessed toward an inside of the case, the recess has a pouring hole connecting the inside and an outside of the case, and the case is sealed by a first sealing member fitted into the pouring hole and a second sealing member joined to the lid portion while being inserted into the recess so as to cover the pouring hole. The method includes a sealing step for fitting first sealing member into the pouring hole and inserting the second sealing member into the recess so as to cover the pouring hole to seal the pouring hole, and a welding step for continuously joining an outer circumferential surface of the second sealing member inserted into the recess to an inner circumferential surface of the recess throughout circumferences of the outer circumferential surface and the inner circumferential surface by laser welding. In the sealing step, a heat insulating member having a lower heat conductivity than each of heat conductivities of the case and the second sealing member is provided in a minute space defined by the recess, the first sealing member and the second sealing member so as to block at least a part of a boundary portion between the outer circumferential surface of the second sealing member and the inner circumferential surface of the recess. In the welding step, welding is completed at a position where the heat insulating member is present in the boundary portion between the outer circumferential surface of the second sealing member and the inner circumferential surface of the recess.

Preferably, the second sealing member is made of material having aluminum as a main component, and the heat insulating member is made of one kind of metal selected from the group consisting of stainless steel, titanium, nickel steel and nickel-chromium steel.

Preferably, the heat insulating member is formed in an annular shape along the inner circumferential surface of the recess.

Preferably, the heat insulating member is provided from a bottom surface of the recess to an inner surface of the second sealing member.

A second aspect of the present invention is a sealed battery including a case having a housing portion with an open face, and a lid portion for closing the open face of the housing portion, in which the lid portion has a recess which is recessed toward an inside of the case, and the recess has a pouring hole connecting the inside and an outside of the case, a first sealing member fitted into the pouring hole, a second sealing member joined to the lid portion while being inserted into the recess so as to cover the pouring hole, and a heat insulating member having a lower heat conductivity than each of heat conductivities of the case and the second sealing member. The case is sealed by the first sealing member and the second sealing member, the heat insulating member is provided in a minute space defined by the recess, the first sealing member and the second sealing member so as to block the entire boundary portion between an outer circumferential surface of the second sealing member and an inner circumferential surface of the recess, and the outer circumferential surface of the second sealing member inserted into the recess and the inner circumferential surface of the recess are continuously joined together throughout circumferences of the outer circumferential surface and the inner circumferential surface by laser welding.

Effects of the Invention

The present invention makes it possible to suppress the welding faults in sealing the case of the sealed battery by the laser welding.

DESCRIPTION OF EMBODIMENTS

Figure 1:
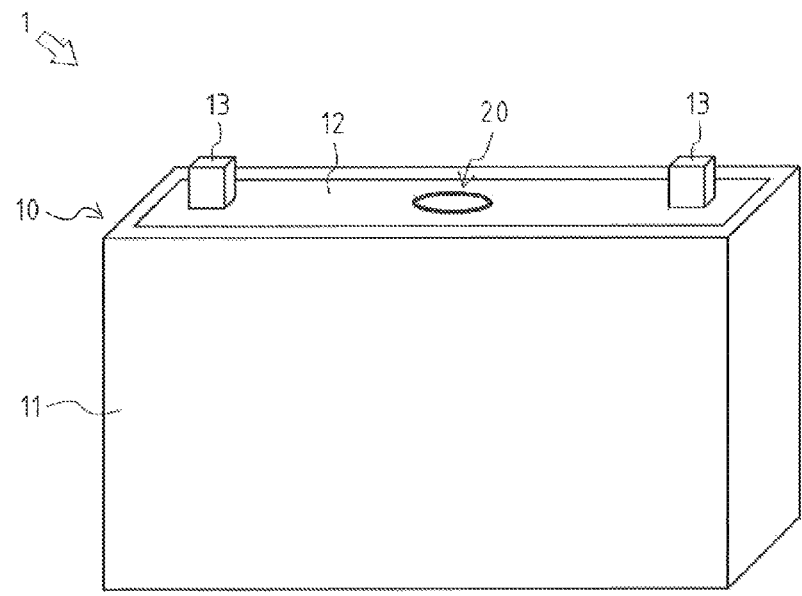
FIG. 1 is a perspective view of a sealed battery according to an embodiment of the present invention.
Figure 2:
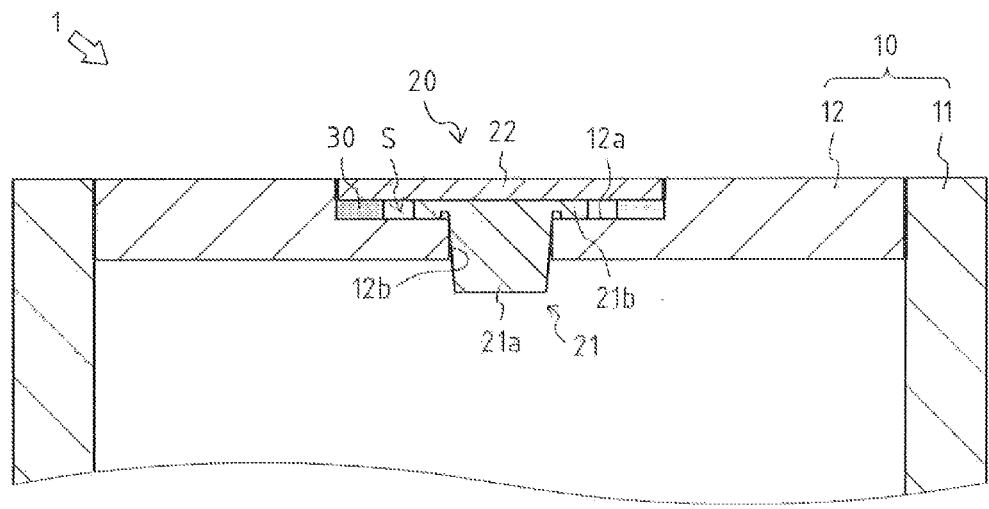
FIG. 2 is a sectional side end view of a structure of an area around a pouring hole of the sealed battery according to the embodiment of the present invention.

With reference to FIGS. 1 and 2, described below is a battery 1 as an embodiment of a sealed battery according to the present invention.

For convenience, a top-bottom direction in FIG. 1 is defined as a top-bottom direction of the battery 1.

As shown in FIG. 1, the battery 1 as a scaled battery includes a case 10 forming an exterior of the battery 1 and a double sealing member 20 for sealing the case 10.

The case 10 is a prismatic container made of material which is generally used for a case of a battery (e.g., material such as A1050-O having aluminum as a main component, or resin such as PPS (polyphenylene sulfide) or PEEK (polyether ether ketone). Inside the case 10, an electrode body (not shown) is housed together with electrolyte solution.

The electrode body is formed by layering paired electrodes (positive and negative electrodes), which are formed into sheet shapes, with a separator sandwiched therebetween and by winding the electrodes and the separator. The electrode body functions as a power generation element when the electrode body is impregnated with the electrolyte solution.

The case 10 includes a housing portion 11 with an open upper face, and a lid portion 12 for closing the open face of the housing portion 11.

The housing portion 11 is a substantially rectangular parallelepiped box and has the open face. Inside the housing portion 11, the electrode body and the electrolyte solution are housed.

The lid portion 12 is a flat plate having a shape conforming to the open face of the housing portion 11 and joined to the housing portion 11 by welding. Paired terminals 13 electrically connected to the paired electrodes of the electrode body are fixed to the lid portion 12.

The paired terminals 13 pass through the lid portion 12 in the top-bottom direction, and protrude upward.

As shown in FIG. 2, a recess 12a is formed in the lid portion 12.

An upper face of the lid portion 12 is recessed toward the inside of the case 10 (recessed downward) to form the recess 12a. The recess 12a has a circular shape in a plan view, and has a certain depth (dimension in the top-bottom direction). In the recess 12a, a pouring hole 12b is formed.

The pouring hole 12b is a through hole through which the electrolyte solution is poured into the case 10, and has a circular shape in the plan view. The pouring hole 12b is positioned at the central portion of the recess 12a so as to connect the inside and the outside of the case 10.

The double sealing member 20 includes a sealing plug 21 and a sealing plate 22, and doubly seals the pouring hole 12b with the sealing plug 21 and the sealing plate 22.

The sealing plug 21 is made of an elastic body such as rubber, elastomer or resin, and functions as a first sealing member for sealing the pouring hole 12b.

The sealing plug 21 has a fitted portion 21a to be fitted into the pouring hole 12b, and a contact portion 21b for coming in contact with the recess 12a.

The fitted portion 21a is formed in substantially a truncated cone. The outer diameter of the smaller diameter end portion (lower end portion) of the fitted portion 21a is slightly smaller than the inner diameter of the pouring hole 12b. The outer diameter of the larger-diameter end portion (upper end portion) of the fitted portion 21a is slightly larger than the inner diameter of the pouring hole 12b.

The contact portion 21b is formed in an annular shape to protrude downward. The contact portion 21b is arranged around the larger-diameter end portion (upper end portion) of the fitted portion 21a, and is formed integrally with the fitted portion 21a, In the sealing plug 21 formed in this manner, the lower end portion of the contact portion 21b comes in contact with the bottom surface (surface perpendicular to the top-bottom direction) of the recess 12a when the fitted portion 21a is fitted into the pouring hole 12b.

In this manner, the fitted portion 21a fitted in the pouring hole 12b and the contact portion 21b in close contact with the recess 12a seal the case 10.

The sealing plate 22 is a circular fiat plate formed to conform to the shape of the recess 12a, and functions as a second sealing member for sealing the pouring hole 12b. The sealing plate 22 is made of the same material as the case 10, The lower surface of the sealing plate 22 is fixed to the upper surface of the sealing plug 21. The outer diameter of the sealing plate 22 is larger than that of the upper surface of the sealing plug 21, and is slightly smaller than the inner diameter of the recess 12a.

The sealing plate 22 is joined to the lid portion 12 while being inserted into the recess 12a so as to cover the pouring hole 12b. Specifically, the outer circumferential surface of the sealing plate 22 inserted in the recess 12a, and the inner circumferential surface (surface along the top-bottom direction) of the recess 12a are continuously joined together throughout circumferences thereof by laser welding.

In this manner, the sealing plate 22 joined to the lid portion 12 completely seals the case 10.

In a space S defined by the double sealing member 20 and the lid portion 12, a heat-insulating member 30 is provided.

The space S is a minute space which is defined by the recess 12a in the lid portion 12, the contact portion 21b of the sealing plug 21 and the sealing plate 22, and which has a volume of approximately 4 mm$^3$.

The heat-insulating member 30 is an annular member conforming to the inner circumferential surface of the recess 12a. The outer diameter of the heat-insulating member 30 is substantially the same as the inner diameter of the recess 12a, and the outer circumferential surface of the heat-insulating member 30 and the inner circumferential surface of the recess 12a are in contact with each other. The inner diameter of the heat-insulating member 30 is slightly larger than the outer diameter of the contact portion 21b of the sealing plug 21. The thickness (dimension in the top-bottom direction) of the heat-insulating member 30 is substantially the same as the shortest distance from the bottom surface (surface perpendicular to the top-bottom direction) of the recess 12a to the inner surface (lower surface) of the sealing plate 22. In other words, the heat-insulating member 30 is provided from the bottom surface of the recess 12a to the lower surface of the sealing plate 22, and blocks the entire boundary portion between the inner circumferential surface of the recess 12a in the lid portion 12 and the outer circumferential surface of the sealing plate 22.

The heat-insulating member 30 is made of material with a lower heat conductivity than those of the case 10 and the sealing plate 22. For example, if the case 10 and the sealing plate 22 are made of material such as A1050-O having aluminum as a main component, metal such as stainless steel, titanium, nickel steel, and nickel-chromium steel may be used as material of the heat-insulating member 30.

In this manner, the heat-insulating member 30 is arranged to block the entire boundary portion between the inner circumferential surface of the recess 12a in the lid portion 12 and the outer circumferential surface of the sealing plate 22 and to occupy a major part of the space S.

Therefore, when the lid portion 12 and the sealing plate 22 are joined together by the laser welding, the heat-insulating member 30 prevents a laser beam from directly entering the space S.

The heat-insulating member 30 is made of the metal with the lower heat conductivity than those of the case 10 and the sealing plate 22.

Therefore, an amount of heat conducted from the laser beam to the space S through the heat-insulating member 30 is smaller than an amount of heat conducted from the laser beam to the space S through the case 10 and the sealing plate 22.

In this way, it is possible to minimize heat conduction from the laser beam to the space S.

Therefore, when the welding of the lid portion 12 and the sealing plate 22 is completed and the space S is sealed, it is possible to minimize rapid expansion of gas, which is present in the space S, due to the heat of the laser beam, and flowing of melted portions of the lid portion 12 and the sealing plate 22 to the outside of the case 10.

Although it is conceivable to use resin with a low heat conductivity as the material of the heat-insulating member 30, a melting point of the heat-insulating member 30 is lower than those of the lid portion 12 and the sealing plate 22, which may affect the welding. Therefore, such resin is not suitable for the heat-insulating member 30.

As the heat-insulating member 30, it is possible to use an existing shim.

Figure 3:
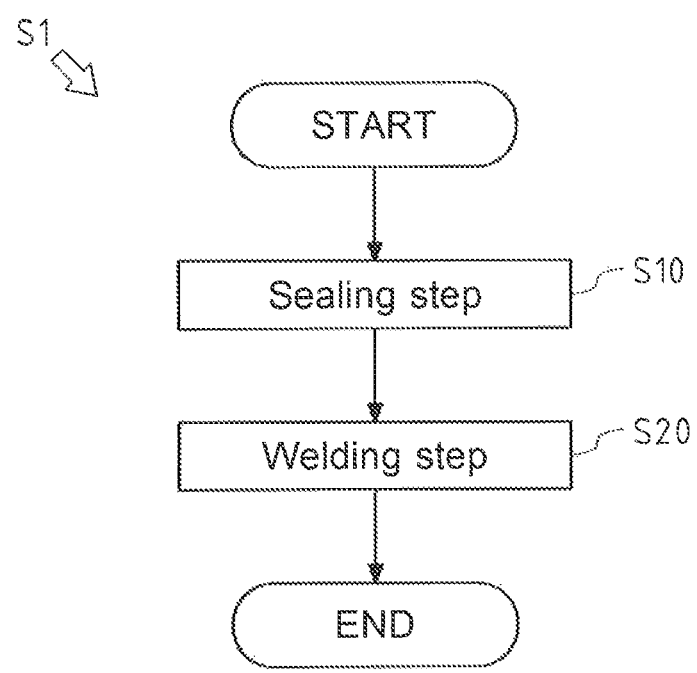
FIG. 3 is a flowchart showing a step for manufacturing the sealed battery according, to the embodiment of the present invention.
Figure 4:
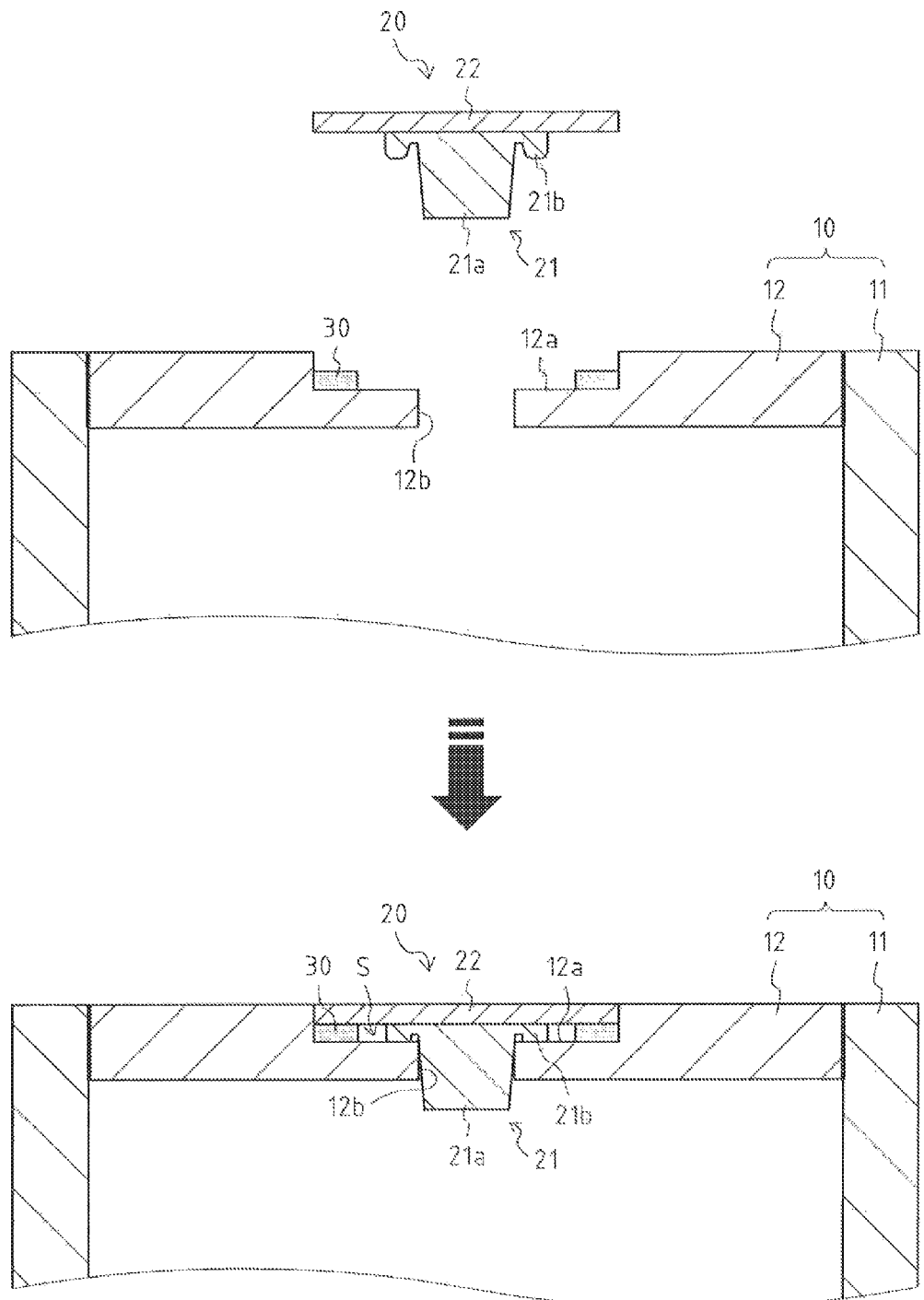
FIG. 4 shows a sealing step.

With reference to FIGS. 3 and 4, described below is a step S1 for manufacturing the battery 1, which is an embodiment of a method for manufacturing the sealed battery according to the present invention.

As shown in FIG. 3, the step S1 includes a sealing step S10 and a welding step S20.

As shown in FIG. 4, the sealing step S10 is a step for sealing the pouring hole 12b with the double sealing member 20.

The sealing step S10 is performed after housing the electrode body into the housing portion 11, welding the housing portion 11 and the lid portion 12 together, and pouring the electrolyte solution into the case 10.

In the sealing step S10, first, the heat-insulating member 30 is arranged in the recess 12a in the lid portion 12.

Then, while reducing pressure in the case 10 by a vacuum pump or the like, the double sealing member 20 is mounted to the case 10.

At this time, since there is a difference in pressure between the inside and the outside of the case 10, the sealing plug 21 is attracted to the bottom surface (surface perpendicular to the top-bottom direction) of the recess 12a and, as a result, the sealing plate 22 is inserted into the recess 12a.

In this way, the sealing plug 21 of the double sealing member 20 seals the case 10, and the heat-insulating member 30 blocks the entire boundary portion between the inner circumferential surface of the recess 12a in the lid portion 12 and the outer circumferential surface of the sealing plate 22.

The welding step S20 is a step for welding the lid portion 12 and the sealing plate 22 together by the laser welding to completely seal the case 10.

In the sealing step S10, the outer circumferential surface of the sealing plate 22 inserted in the recess 12a and the inner circumferential surface (surface along the top-bottom direction) of the recess 12a are continuously joined together by the laser welding throughout circumferences thereof.

At this time, as mentioned previously, the heat-insulating member 30 with the lower heat conductivity than those of the case 10 and the sealing plate 22 is provided in the space S so as to block the entire boundary portion between the inner circumferential surface of the recess 12a in the lid portion 12 and the outer circumferential surface of the sealing plate 22. This makes it possible to minimize the welding faults caused by the rapid expansion of the gas, which is present in the sealed space S, due to the heat of the laser beam.

It is preferable to perform the welding step S20 after partially welding, the lid portion 12 and the sealing plate 22 in advance so as to restrict movement of the double sealing member 20.

As mentioned above, the sealing step S10 and the welding step S20 are performed in this order in the step S1, and thereby the battery 1 is manufactured.

In the present embodiment, the thickness (dimension in the top-bottom direction) of the heat-insulating member 30 is substantially the same as the shortest distance from the bottom surface (surface perpendicular to the top-bottom direction) of the recess 12a to the inner surface (lower surface) of the sealing plate 22. However, the thickness may be smaller than the shortest distance from the bottom surface of the recess 12a to the inner surface of the sealing plate 22 as long as the above-mentioned welding faults are minimized.

Figure 5:
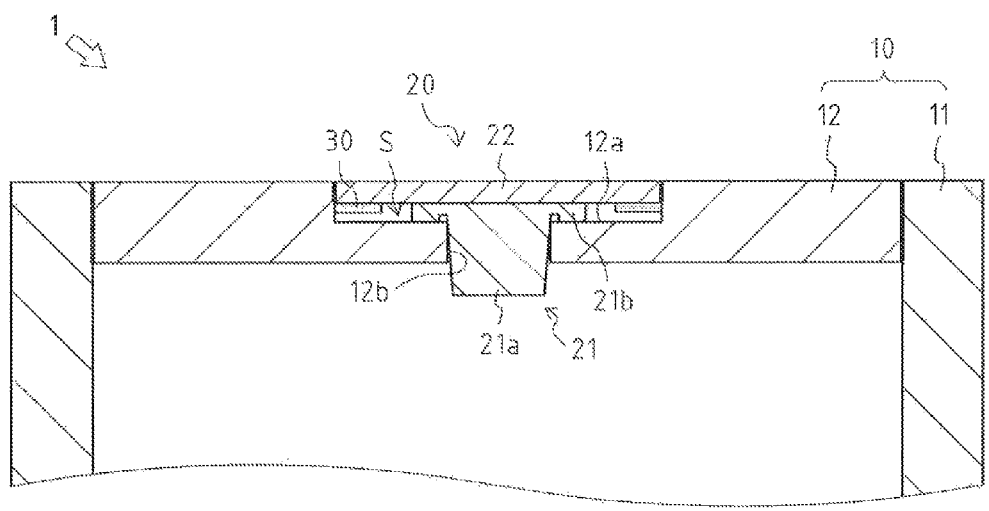
FIG. 5 shows another embodiment of the sealed battery according, to the present invention.

In this case, as shown in FIG. 5, the heat-insulating member 30 may be arranged in the space S so as to block the entire boundary portion between the inner circumferential surface of the recess 12a in the lid portion 12 and the outer circumferential surface of the sealing plate 22 by fixing the heat-insulating member 30 to the lower surface of the sealing plate 22, for example.

However, if the thickness of the heat-insulating member 30 is substantially the same as the shortest distance from the bottom surface of the recess 12a to the lower surface of the scaling plate 22, it is only necessary to dispose the heat insulating member 30 in the recess 12a. Therefore, preferably, the thickness of the heat-insulating member 30 is substantially the same as the shortest distance from the bottom surface of the recess 12a to the lower surface of the sealing plate 22.

Moreover, the shortest distance between the outer circumferential surface and an inner circumferential surface of the heat-insulating member 30 may be changed properly in such a range as to be able to minimize the above-mentioned welding faults. However, the longer the shortest distance between the outer circumferential surface and the inner circumferential surface of the heat-insulating member 30 is, the smaller the amount of heat conducted from the laser beam to the space S through the heat-insulating member 30 becomes. Therefore, it is preferable that the shortest distance between the outer circumferential surface and the inner circumferential surface of the heat-insulating member 30 is as long as possible.

In the present embodiment, the heat-insulating member 30 is formed in the annular shape to block the entire boundary portion between the inner circumferential surface of the recess 12a and the outer circumferential surface of the sealing plate 22. However, the shape of the heat-insulating member 30 is not limited as long as the above-mentioned welding faults are minimized.

Figure 6:
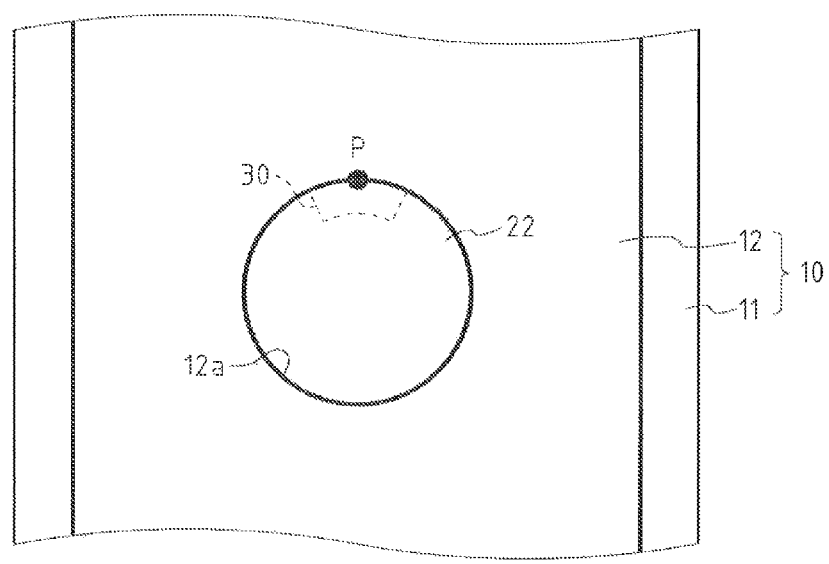
FIG. 6 shows another embodiment of the sealed battery according to the present invention.
Figure 7:
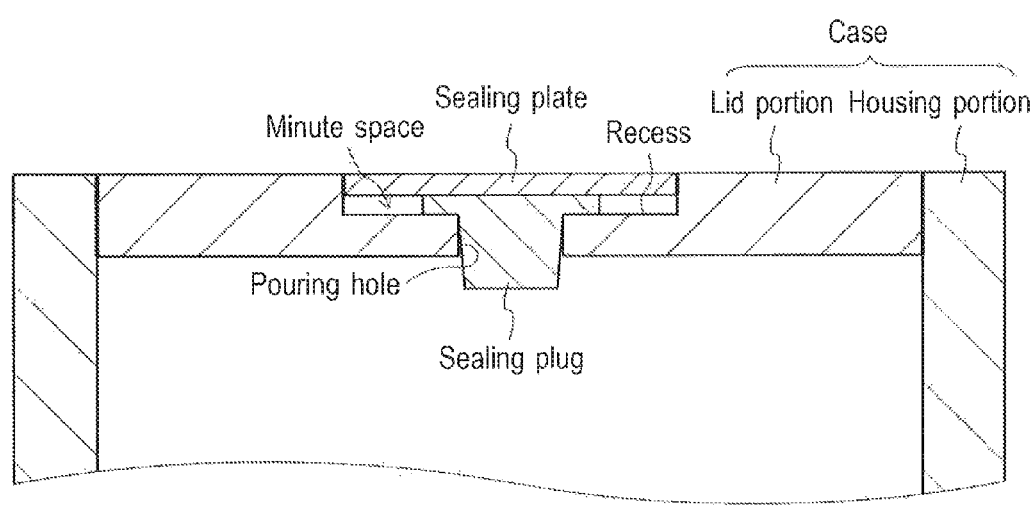
FIG. 7 shows a conventional sealed battery.

For example, as shown in FIG. 6, the heat-insulating member 30 may be in a shape formed by cutting an annular member in radial directions to block a part of the boundary portion between the inner circumferential surface of the recess 12a and the outer circumferential surface of the sealing plate 22.

In this case, a position P where laser welding is completed may be set at a position, in the boundary portion between the inner circumferential surface of the recess 12a and the outer circumferential surface of the sealing plate 22, where the heat-insulating member 30 is present.

The laser welding starts at the position P and is completed at the position R Accordingly, the part situated at the position P of the boundary portion between the inner circumferential surface of the recess 12a and the outer circumferential surface of the sealing plate 22 is finally welded, and thereby the space S is sealed.

Therefore, if heat conduction from a laser beam to the space S can be minimized at least at the position P, it is possible to minimize the welding faults caused by rapid expansion of gas, which is present in the sealed space S, due to heat of the laser beam.

However, if the heat-insulating member 30 is in the annular shape, it is unnecessary to exactly set the position P. Therefore, it is preferable to form the heat-insulating member 30 into the annular shape.

Furthermore, as long as the above-mentioned welding faults are minimized, the material of which each of the heat-insulating member 30, the case 10 and the sealing plate 22 is made may be changed properly in such a manner that the heat conductivity of the heat-insulating member 30 is lower than the heat conductivities of the case 10 and the sealing plate 22.

A heat conductivity of the material such as A1050-O having aluminum as the main component is approximately 200 W/(m·K) and heat conductivities of stainless steel, titanium, nickel steel, and nickel-chromium steel are approximately 15 to 20 W/(m·K).

Thus, the heat conductivities of stainless steel, titanium, nickel steel, and nickel-chromium steel are much lower than the heat conductivity of the material such as A1050-O having aluminum as the main component.

The larger a difference between the heat conductivity of the heat-insulating member 30 and the heat conductivities of the case 10 and the sealing plate 22 is, the smaller the amount of heat conducted from the laser beam to the space S through the heat-insulating member 30 becomes.

Therefore, preferably, each of the case 10 and the sealing plate 22 is made of the material such as A1050-O having aluminum as the main component, and the heat-insulating member 30 is made of stainless steel, titanium, nickel steel, or nickel-chromium steel.

INDUSTRIAL APPLICABILITY

The present invention can be applied to the sealed battery and the method for manufacturing the same.

REFERENCE SIGNS LIST

1: battery (sealed battery)
10: case
11: housing portion
12: lid portion
12a: recess
12b: pouring hole
20: double sealing member
21: sealing plug (first sealing member)
21a: fitted portion.
21b: contact portion
22: sealing plate (second sealing member)
30; heat-insulating member
S: space

The invention claimed is:

1. A method for manufacturing a sealed battery including a case having a housing portion with an open face, and a lid portion for closing the open face of the housing portion, in which the lid portion has a recess which is recessed toward an inside of the case, the recess has a pouring hole connecting the inside and an outside of the case, and the case is sealed by a first sealing member fitted into the pouring hole and a second sealing member joined to the lid portion while being inserted into the recess so as to cover the pouring hole, the method comprising:

a sealing step for fitting the first sealing member into the pouring hole and inserting the second sealing member into the recess so as to cover the pouring hole to seal the pouring hole; and a welding step for continuously joining an outer circumferential surface of the second sealing member inserted into the recess to an inner circumferential surface of the recess throughout circumferences of the outer circumferential surface and the inner circumferential surface by laser welding, wherein in the sealing step, a heat insulating member having a lower heat conductivity than each of heat conductivities of the case and the second sealing member is provided in a minute space defined by the recess, the first sealing member and the second sealing member so as to block at least a part of a boundary portion between the outer circumferential surface of the second sealing member and the inner circumferential surface of the recess, and in the welding step, welding is completed at a position where the heat insulating member is present in the boundary portion between the outer circumferential surface of the second sealing member and the inner circumferential surface of the recess.

2. The method for manufacturing the sealed battery according to claim 1, wherein the second sealing member is made of material having aluminum as a main component, and the heat insulating member is made of one kind of metal selected from the group consisting of stainless steel, titanium, nickel steel and nickel-chromium steel.

3. The method for manufacturing the sealed battery according to claim 1, wherein the heat insulating member is formed in an annular shape along the inner circumferential surface of the recess.

4. The method for manufacturing the sealed battery according to claim 1, wherein the heat insulating member is provided from a bottom surface of the recess to an inner surface of the second sealing member.

5. A sealed battery comprising:

a case having a housing portion with an open face, and a lid portion for closing the open face of the housing portion, in which the lid portion has a recess which is recessed toward an inside of the case, and the recess has a pouring hole connecting the inside and an outside of the case;

a first sealing member fitted into the pouring hole;

a second sealing member joined to the lid portion while being inserted into the recess so as to cover the pouring hole; and a heat insulating member having a lower heat conductivity than each of heat conductivities of the case and the second sealing member, wherein the case is sealed by the first sealing member and the second sealing member, the heat insulating member is provided in a minute space defined by the recess, the first sealing member and the second sealing member so as to block the entire boundary portion between an outer circumferential surface of the second sealing member and an inner circumferential surface of the recess, and the outer circumferential surface of the second sealing member inserted into the recess and the inner circumferential surface of the recess are continuously joined together throughout circumferences of the outer circumferential surface and the inner circumferential surface by laser welding.

* * * * *